United States Patent
Liu et al.

(10) Patent No.: US 7,848,203 B2
(45) Date of Patent: Dec. 7, 2010

(54) AUTOMATIC DISK REPRODUCING APPARATUS AND METHOD OF THE SAME

(75) Inventors: Ming-Hsun Liu, 3F, No. 8, Lane 143, Xinming Rd., Neihu District, Taipei (TW) 11471; Chung-Hsuan Tsai, Taipei (TW)

(73) Assignee: Ming-Hsun Liu, Taipei (TW)

( * ) Notice: Subject to any disclaimer, the term of this patent is extended or adjusted under 35 U.S.C. 154(b) by 0 days.

(21) Appl. No.: 12/621,433

(22) Filed: Nov. 18, 2009

(65) Prior Publication Data

US 2010/0061209 A1    Mar. 11, 2010

Related U.S. Application Data

(62) Division of application No. 11/669,931, filed on Jan. 31, 2007, now Pat. No. 7,703,109.

(30) Foreign Application Priority Data

Feb. 22, 2006   (TW) .............................. 95105884 A

(51) Int. Cl.
G11B 7/28 (2006.01)
(52) U.S. Cl. ........................................ 369/84; 720/601
(58) Field of Classification Search .............. 369/30.28, 369/30.31, 30.32, 30.33, 30.34, 30.35, 84, 369/85; 720/601, 619, 622, 632

See application file for complete search history.

(56) References Cited

U.S. PATENT DOCUMENTS

| | | | | |
|---|---|---|---|---|
| 6,990,674 B1 * | 1/2006 | Cummins et al. | ........... | 720/623 |
| 7,254,818 B2 * | 8/2007 | Hagstrom | ................... | 720/601 |
| 7,301,550 B2 * | 11/2007 | Cummins et al. | ........... | 347/171 |
| 7,448,051 B2 * | 11/2008 | Nelson et al. | ............... | 720/601 |
| 7,703,109 B2 * | 4/2010 | Liu et al. | ..................... | 720/623 |
| 2007/0008835 A1 * | 1/2007 | Russ | ....................... | 369/30.34 |
| 2008/0123476 A1 * | 5/2008 | Liu et al. | ................. | 369/30.28 |

\* cited by examiner

*Primary Examiner*—Angel A. Castro
(74) *Attorney, Agent, or Firm*—Pai Patent & Trademark Law Firm; Chao-Chang David Pai

(57) ABSTRACT

An automatic disk reproducing apparatus includes a chassis body, a duplicating device, a disk feeding device, a disk conveying device and a disk holder. The duplicating device is mounted in the chassis body and has a tray. The disk feeding device is mounted on the chassis body to hold a stack of compact disks in position and allows gravity to pull the compact disk at the bottom of the stack of compact disks into the tray for duplication. The disk conveying device includes two conveying members and two arms connected respectively to the conveying members to elevate the recorded compact disk from the tray after the duplication of the compact disk and convey the recorded compact disk to the disk holder.

4 Claims, 18 Drawing Sheets

AUTOMATIC DISK REPRODUCING APPARATUS AND METHOD OF THE SAME

RELATED APPLICATIONS

The present application is a division of prior U.S. application Ser. No. 11/669,931 filed Jan. 31, 2007, entitled "AUTOMATIC DISK REPRODUCING APPARATUS AND METHOD OF THE SAME", currently pending. The prior U.S. application is based on, and claims priority from, Taiwan Application Serial Number 95105884, filed Feb. 22, 2006, the disclosure of which is hereby incorporated by reference herein in its entirety.

BACKGROUND

1. Field of the Invention

The present invention relates to an automatic disk reproducing apparatus and a method of the same. More particularly, the present invention relates to an automatic disk reproducing apparatus with a disk feeding device that holds a stack of compact disks in position and allows gravity to pull the compact disk at the bottom of the stack of compact disks onto a tray for duplication.

2. Description of Related Art

Optical disks, are so-called compact disks (CDs), contain digital data such as music, text, video, computer programs, etc. that can be read out or written in by laser beams. Optical disks have been extensively used as a medium to store or replicate the aforementioned digital data.

Generally, mass replication of compact disks uses stamps to transfer data from the master to unrecorded compact disks. However, the stamp method is only suitable to replicate an amount of a thousand or more disks.

Otherwise, the cost of replicating each disk will be high and not economic. For home users or small business users, burners are another solution to replicate disks when there only several or tens of disk copies are needed.

U.S. Pat. No. 6,141,298 discloses a programmable self-operating compact disk duplication system. The compact disk duplication system comprises multiple burners that are stacked one on another, and a pivotal transport tower with an arm that moves upwardly and downwardly. The arm on the pivotal transport tower moves and transports the disks including the master disk, unrecorded disks or recorded disks among the burners and disk spindle members. However, the mechanical structure of the aforementioned system is sophisticated, which causes high manufacturing costs. Besides, the aforementioned system is bulky and occupies a large storage space that is inconvenient to be packaged and/or transported.

U.S. Pat. No. 6,490,232 discloses a compact disk feeder. The compact disk feeder comprises a transfer device that elevates and spins an arm to move unrecorded compact disks from a disk holder to the tray of a printer to print the cover of the disk. After the printing operation of the cover is completed, the arm removes the printed disk from the tray of the printer and transports the printed disk to another disk holder. Likewise, the aforementioned compact disk feeder is bulky, and hence is inconvenient to package or transport.

Further, the aforementioned compact disk feeder uses the arm to remove a single disk from a stack of compact disks and transport the disk to the tray of the printer or the burner. The mechanical structure of the arm and the automatic control system of the arm are complex. The arm also requires and occupies a large area to move, which makes the aforementioned compact disk feeder inconvenient to use.

Therefore, there is a need to provide an improved automatic compact disk reproducing apparatus to mitigate or obviate the aforementioned problems.

SUMMARY

An object of the present invention is to provide an automatic disk reproducing apparatus and a method of the same that the apparatus is compact and does not occupy large space during replication operation.

An embodiment of an automatic disk reproducing apparatus in accordance with the present invention includes a chassis body, a duplicating device, a disk feeding device, a disk conveying device and a disk holder. The duplicating device is mounted in the chassis body and has a tray. The disk feeding device is mounted on the chassis body to hold a stack of compact disks in position and feeds the bottom one of the stack of compact disks onto the tray by falling to duplicate. The disk conveying device includes two conveying members and two arms connected respectively to the conveying members to elevate the recorded compact disk from the tray after the duplication of the compact disk, and convey the recorded compact disk to the disk holder.

The disk feeding device comprises a disk feeding mechanism. The disk feeding mechanism comprises multiple feeding wheels, a power transmission member, a power device and a reducing device coupled to the power device. The feeding wheels engage the reducing device and are rotated by the reducing device through the power transmission member as the power device is turned on.

The rotations of the feeding wheels move compact disk at the bottom of the stack of compact disks until gravity makes the compact disk fall onto the tray. The fallen compact disk is received on the tray of the duplicating device. The tray with the compact disk is retracted to duplicate. After the duplication, the tray with the recorded compact disk is ejected. The conveying members elevate the recorded compact disk from the tray so that the tray can be retracted again. In addition, the conveying members convey the recorded compact disk to the disk holder.

The apparatus further comprises a housing mounted on the chassis body. The housing comprises an outer casing and a cover. The outer casing is mounted outside the chassis body. The cover is pivotally mounted on the chassis body over the outer casing.

Since gravity pulls the compact disk onto the tray, the large space for the mechanical component to move the compact disks such as using a robot to move compact disks does not require. Thus, the apparatus is compact and is convenient to use.

In addition, the apparatus is also convenient to transport or store because of its compact size. The apparatus saves the cost of shipping or storing. The main components of the apparatus can be easily demounted, therefore, the apparatus is benefit to manufacture, repair and upgrade.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
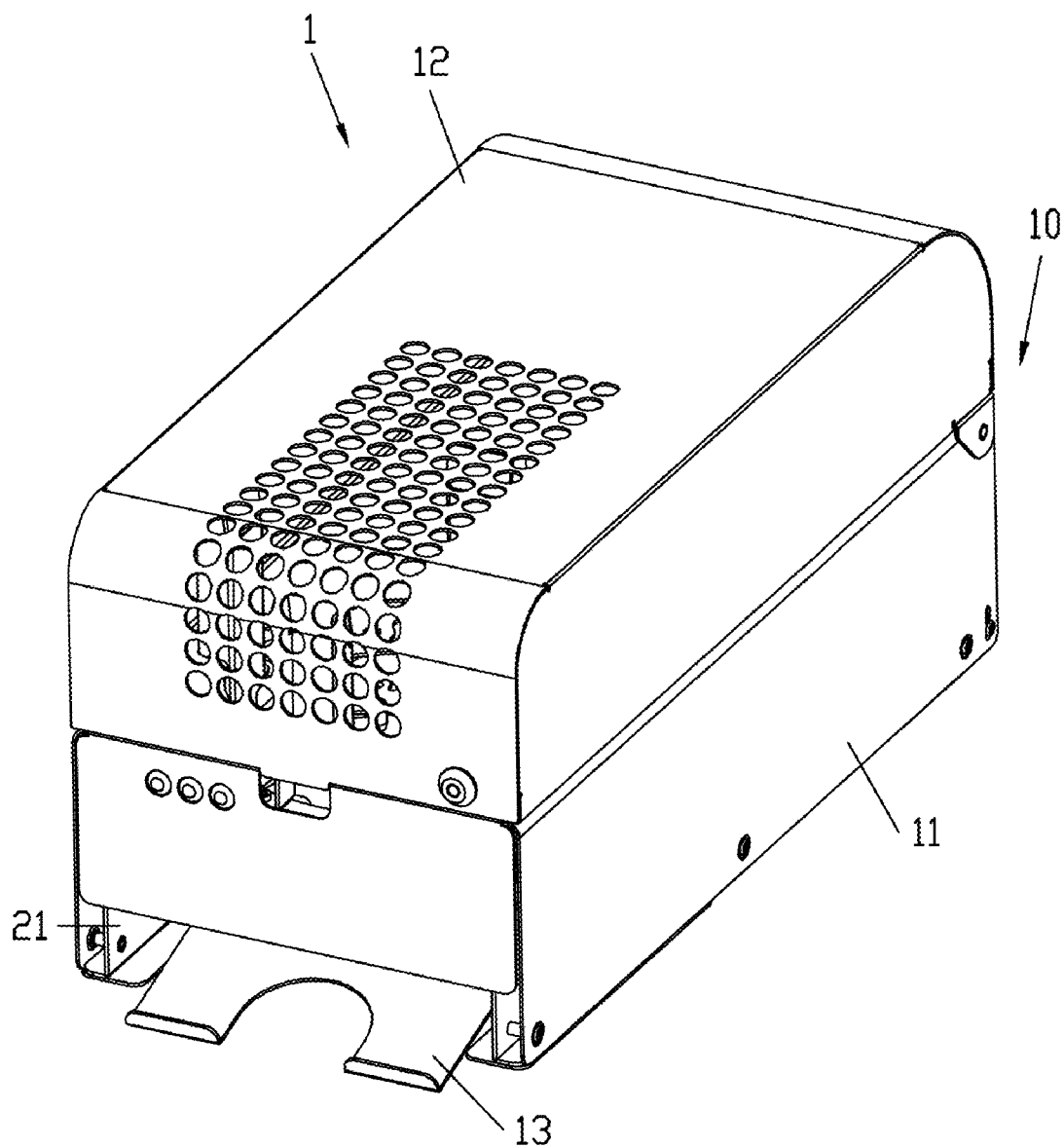
FIG. 1 is a perspective view of an embodiment of an automatic disk reproducing apparatus in accordance with the present invention.
Figure 2:
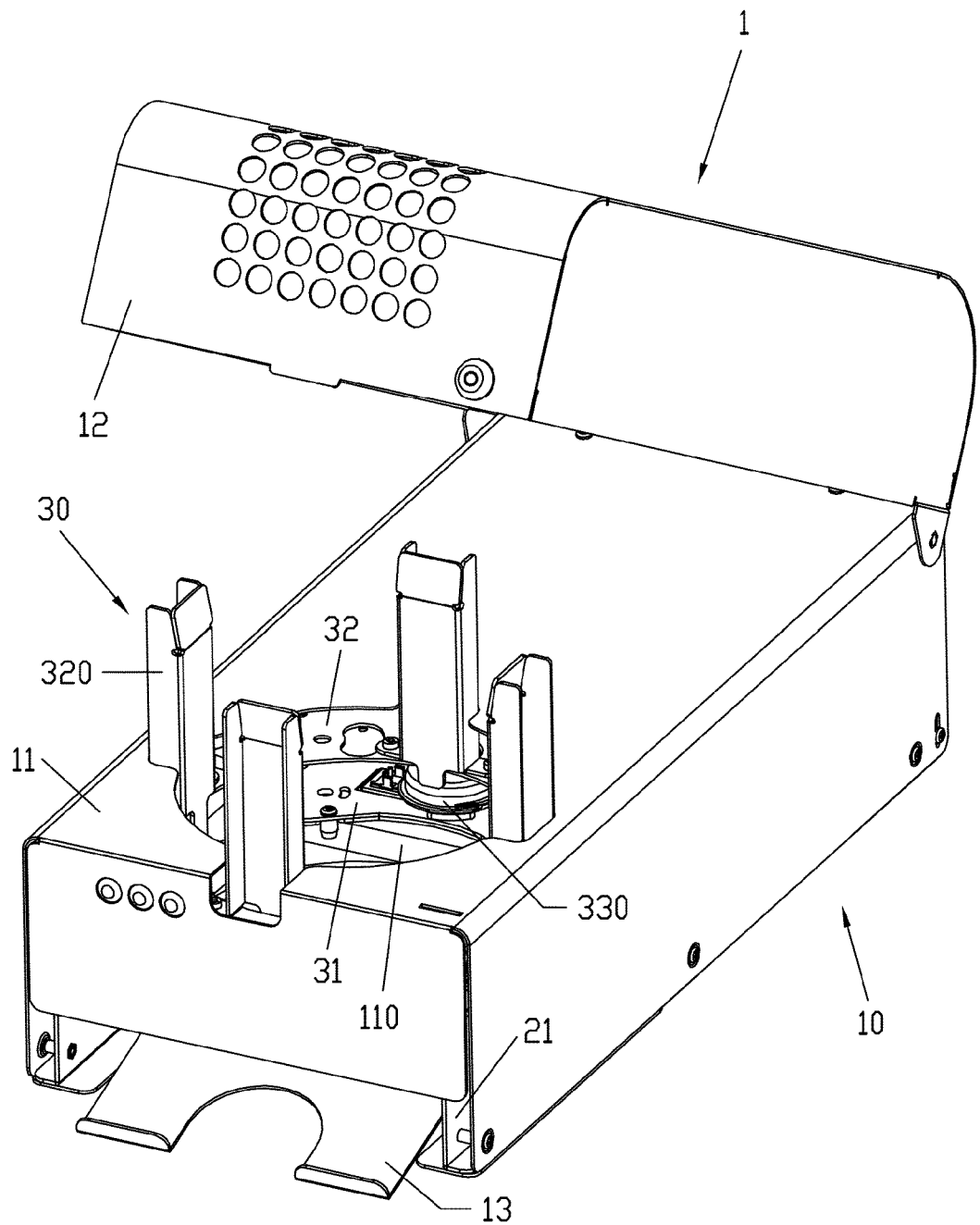
FIG. 2 is a perspective view of the apparatus in FIG. 1 when a cover of the apparatus is open.
Figure 3:
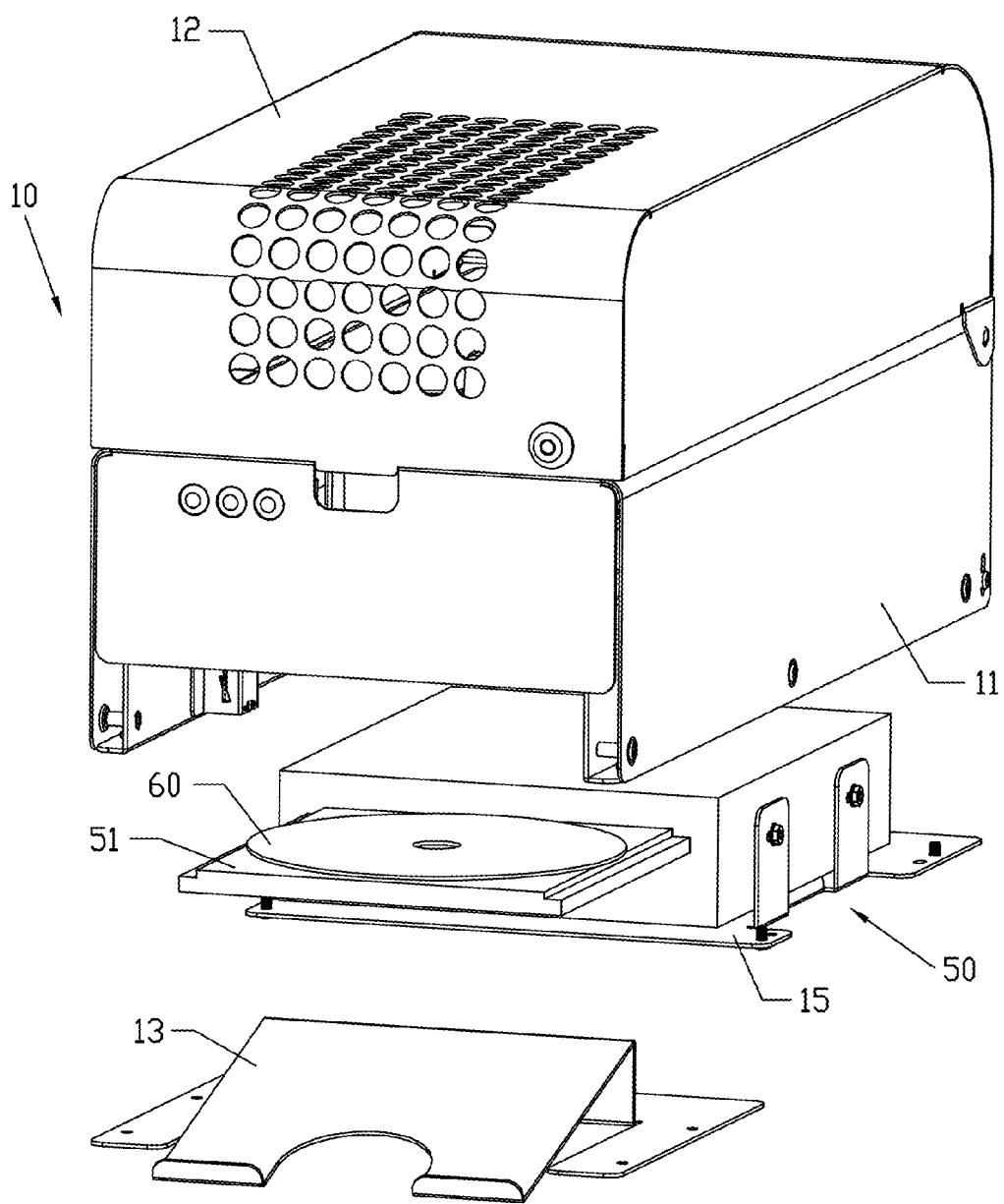
FIG. 3 is an exploded perspective view of the apparatus in FIG. 1.
Figure 4A:
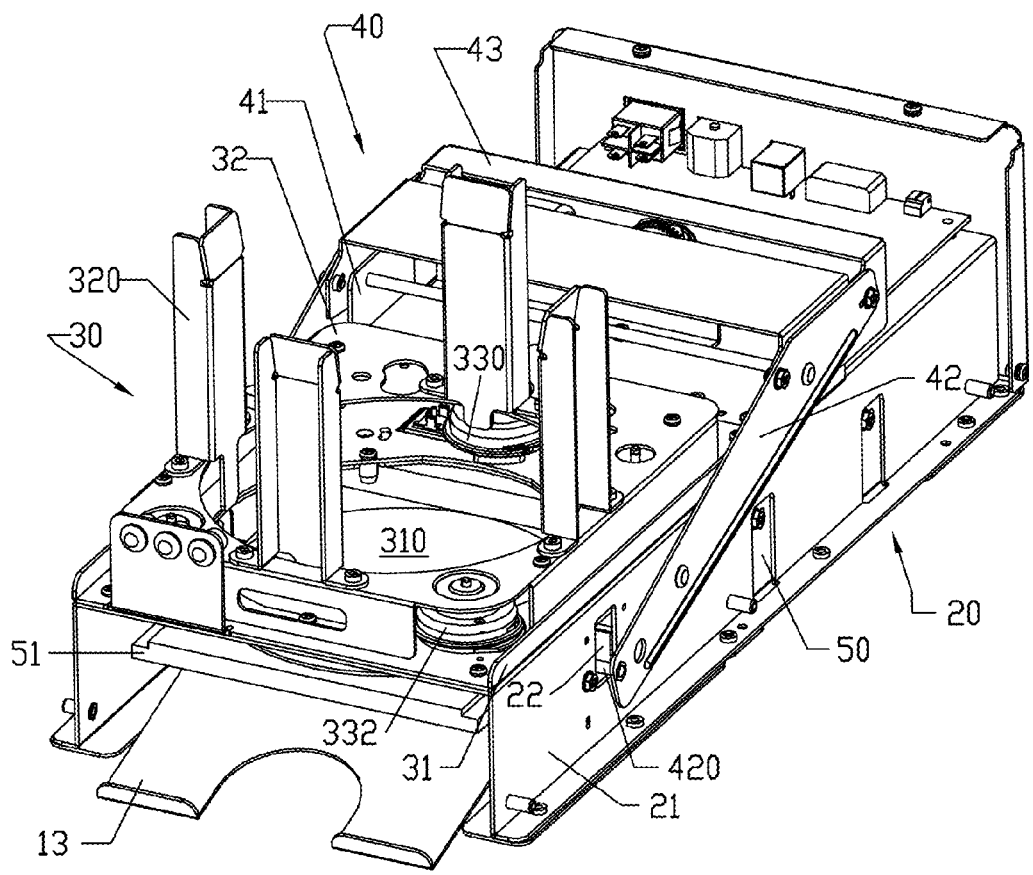
FIG. 4A is a perspective view of the apparatus in FIG. 1 when a housing of the apparatus is removed.
Figure 4B:
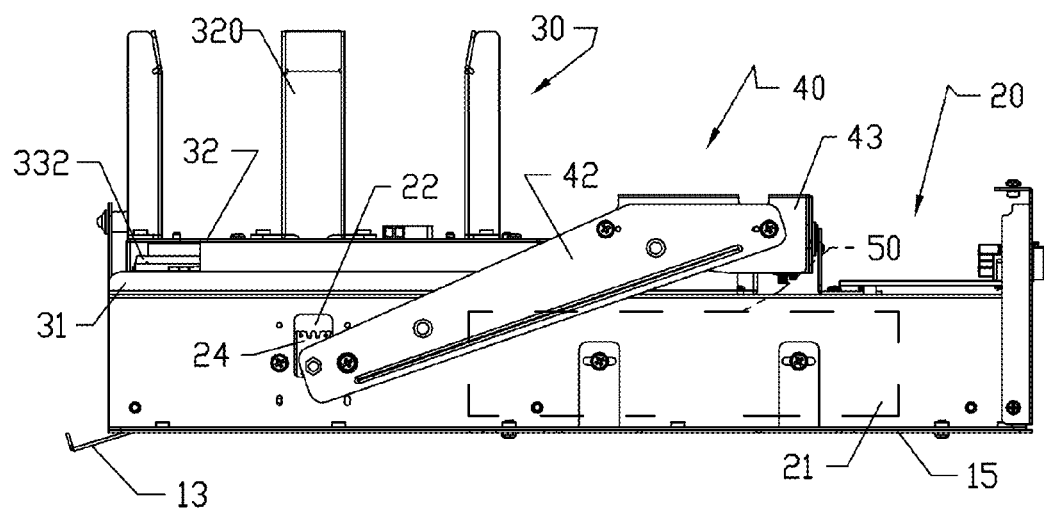
FIG. 4B is a side view of the apparatus in FIG. 4A.
Figure 5A:
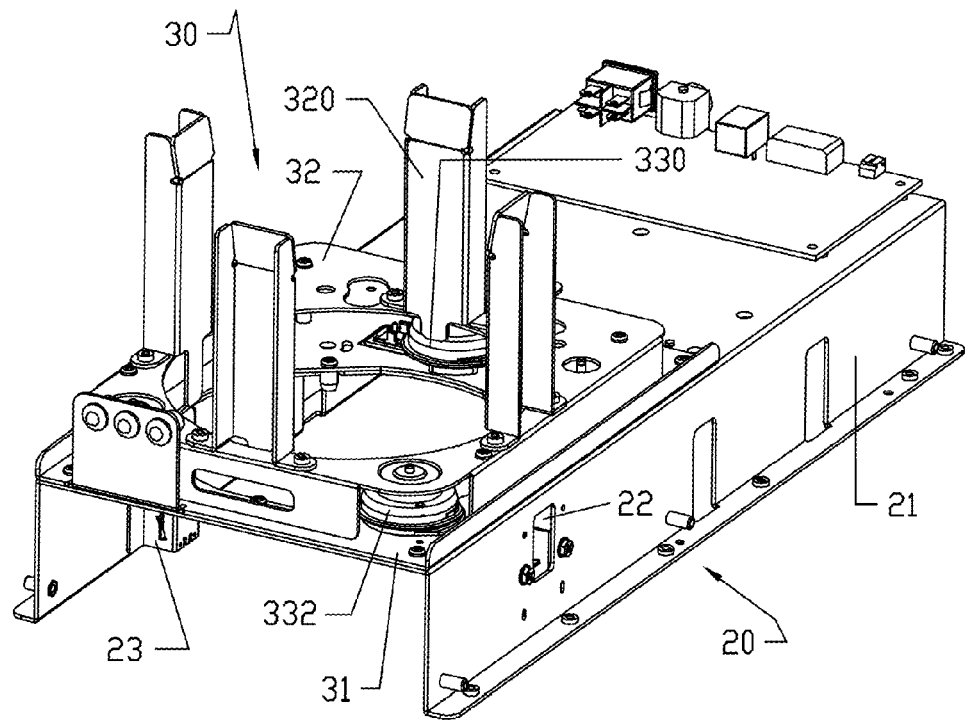
FIG. 5A is a perspective view of a chassis body and a disk feeding device of the apparatus in FIG. 1.
Figure 5B:
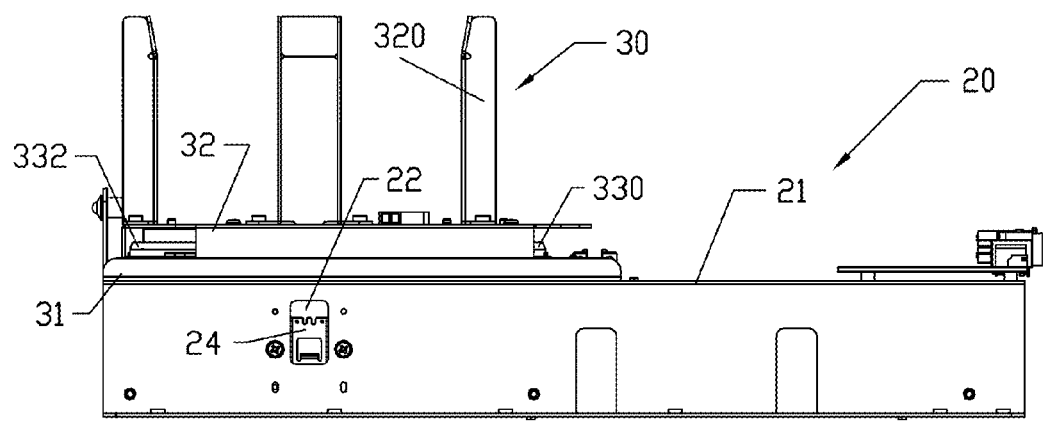
FIG. 5B is a side view of the chassis body and the disk feeding device of the apparatus in FIG. 5A.

Reference will now be made in detail to the present preferred embodiments of the invention, examples of which are illustrated in the accompanying drawings. Wherever possible, the same reference numbers are used in the drawings and the description to refer to the same or like parts.

Embodiments of an automatic compact disk reproducing apparatus and a method for the same in accordance with the present invention are provided. The apparatus comprises a duplicating device, a disk feeding device, a frame and a disk conveying device. The duplicating device may be a tray device and has a tray. The tray has an ejected position and a retracted position. The tray is under the disk feeding device when the tray is at the ejected position. The disk feeding device holds a stack of unrecorded compact disks and gravity pulls a single compact disk onto the tray. The disk feeding device gradually separates the compact disks so that one compact disk falls on the tray to be duplicated after the tray with the compact disk moves to its retracted position. After duplication, the tray moves to its ejected position again, and the recorded compact disk is removed from the tray and conveyed to a disk holder by conveying members of the disk conveying device where the conveying members are movably mounted on the frame.

Refer to FIG. 1, FIG. 2, FIG. 3, FIG. 4A and FIG. 4B. An embodiment of an automatic compact disk reproducing apparatus 1 in accordance with the present invention is illustrated. The apparatus 1 comprises a housing 10, a chassis body 20, a disk feeding device 30, a disk conveying device 40 and a duplicating device 50.

The housing 10 is mounted on the chassis body 20 and comprises an outer casing 11 and a cover 12. The outer casing 11 is mounted outside the chassis body 20. The cover 12 is pivotally mounted on the chassis body 20 over the outer casing 11.

The chassis body 20 comprises a mounting plate 15, two wings 21 and a disk holder 13. The mounting plate 15 is demountably mounted to the wings 21 through which the duplicating device 50 is mounted. The duplicating device 50 may be a tray device such as a compact disk burner and has a tray 51 that can be ejected and retracted. The tray 51 can hold a compact disk 60 and move between an ejected position and a retracted position. The disk holder 13 is attached to the wings 21 at a position corresponding to the ejected position of the tray 51 so as to hold the recorded compact disks after the duplication.

The disk feeding device 30 is mounted on the chassis body 20 at a position over the ejected position of the tray 51 to gradually separate a stack of unrecorded compact disks 60 and allows gravity to pull a single unrecorded compact disk 60 onto the tray 51.

The disk conveying device 40 is mounted on the chassis body 20 and comprises two conveying members 24. The conveying members 24 are respectively and movably mounted on the wings 21 to remove the compact disk 60 from the tray 51 and convey the compact disk 60 to the disk holder 13 after the duplication operation of the disk 60 is completed.

The outer casing 11 has a disk feeding hole 110 that is defined at a position corresponding to the disk feeding device 30 through which the compact disk 60 passes.

Refer to FIG. 5A, FIG. 5B, FIG. 8A and FIG. 8B. The chassis body 20 further comprises two tracks 23 and two resilient members 25. The wings 21 respectively have a through hole 22 defined at a position corresponding to the ejected position of the tray 51. The tracks 23 are respectively mounted on the wings 21 inside the chassis body 20 and are respectively aligned with the through holes 22. The conveying members 24 are slidably and respectively mounted on the tracks 23 and slide respectively along the tracks 23. The resilient members 25 are springs and are respectively connected to the conveying members 24 and the tracks 23. In the embodiment, each conveying member 24 has a recess 240 aligned with the associated through hole 22 through which a driving member 420 is inserted to move the conveying member 24 upward and presses the conveying member 24 to an inclined state. The upward movements of the conveying members 24 elongate the resilient members 25 that draw and return the conveying members 24 downward when the driving members 420 move downward. The resilient member 25 has two ends, and one end is connected to the conveying member 24 and the other end is connected to the track 23.

Figure 6A:
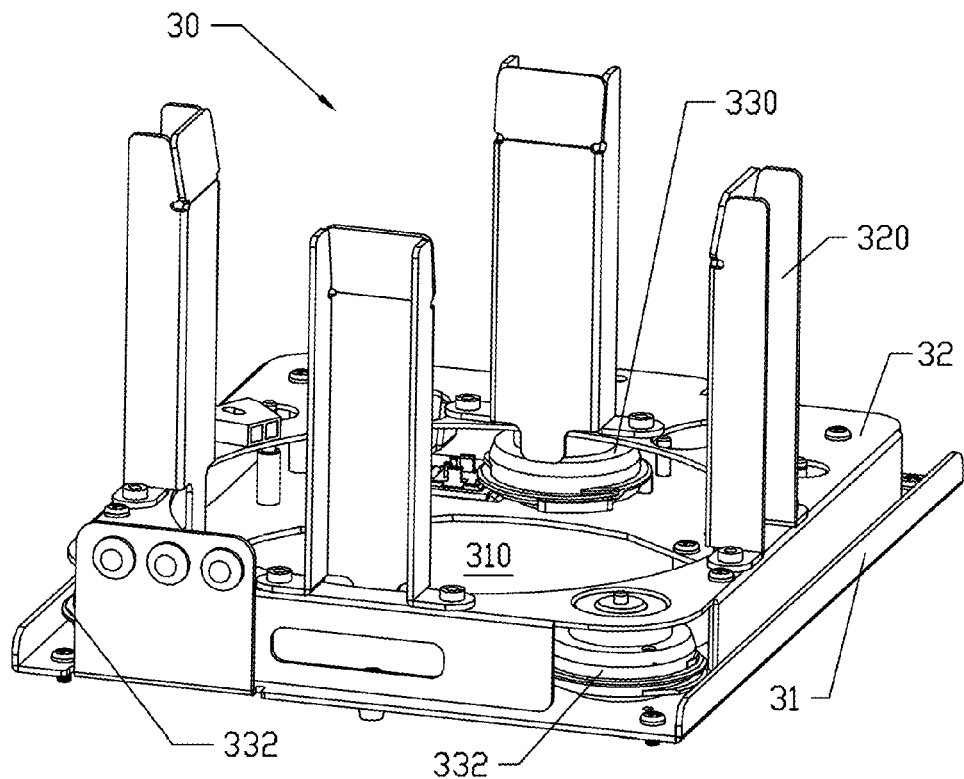
FIG. 6A is a perspective view of the disk feeding device of the apparatus in FIG. 5A.
Figure 6B:
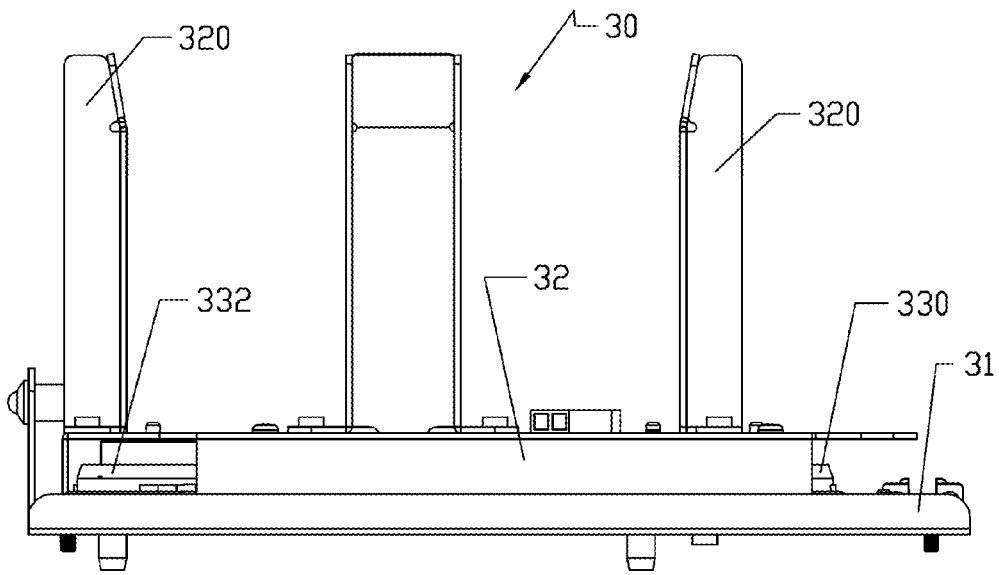
FIG. 6B is a side view of the disk feeding device of the apparatus in FIG. 6A.
Figure 7A:
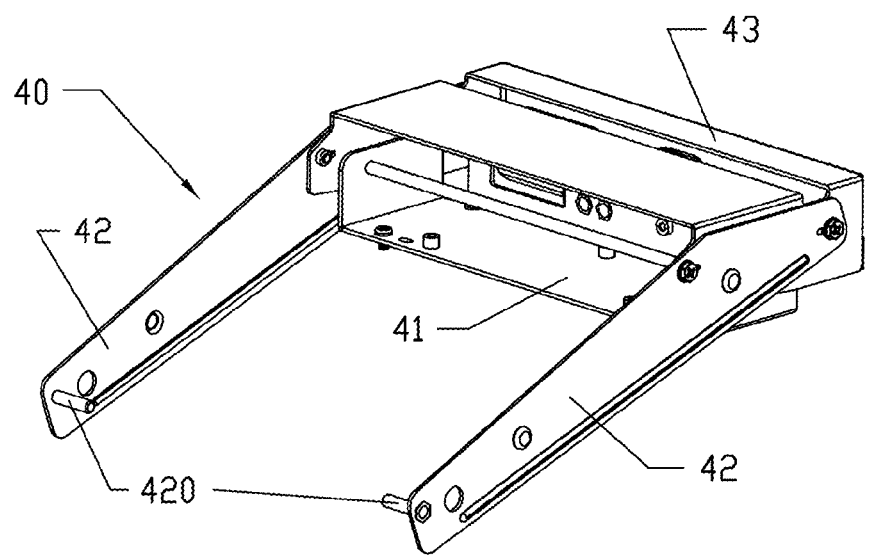
FIG. 7A is a perspective view of a disk conveying device of the apparatus in FIG. 1.
Figure 7B:
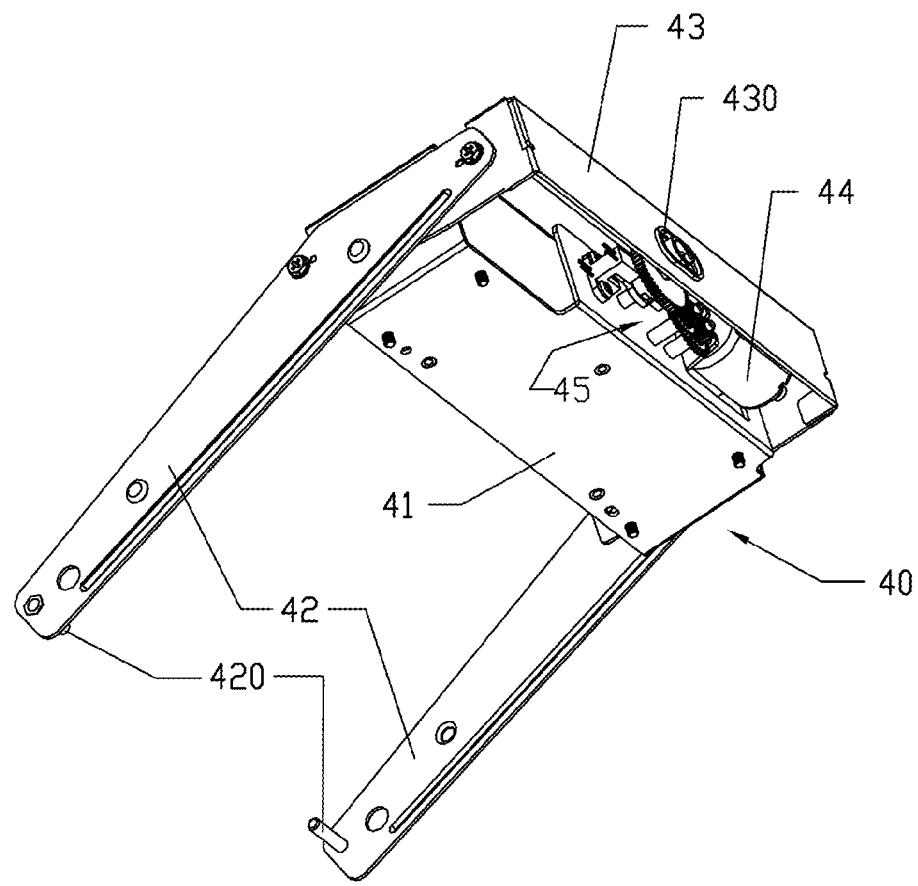
FIG. 7B is a bottom perspective view of the conveying device of the apparatus in FIG. 7B.
Figure 7C:
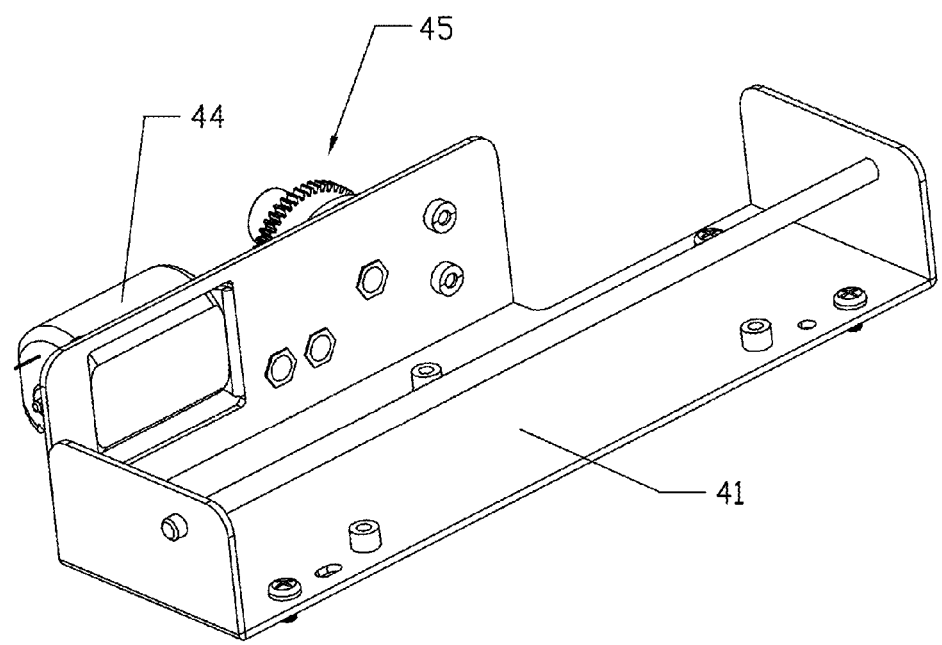
FIG. 7C is a perspective view of a stationary support of the disk conveying device of the apparatus in FIG. 7A.
Figure 7D:
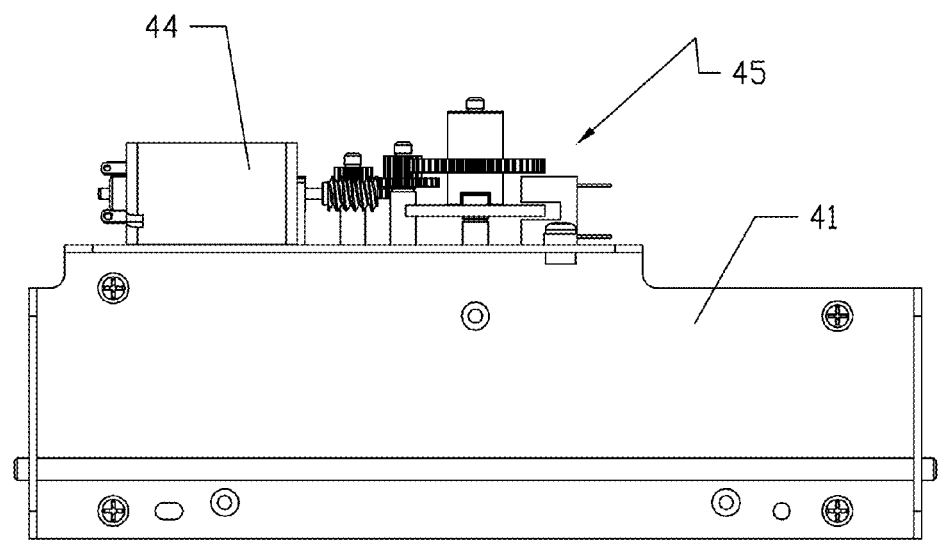
FIG. 7D is a side view of the stationary support of the conveying device of the apparatus in FIG. 7C.
Figure 8A:
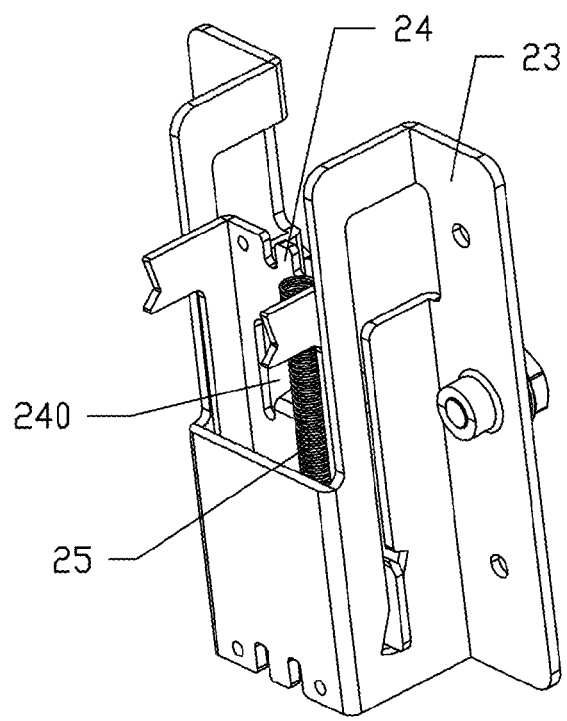
FIG. 8A is a perspective view of a conveying member mounted in a track of the conveying device.
Figure 8B:
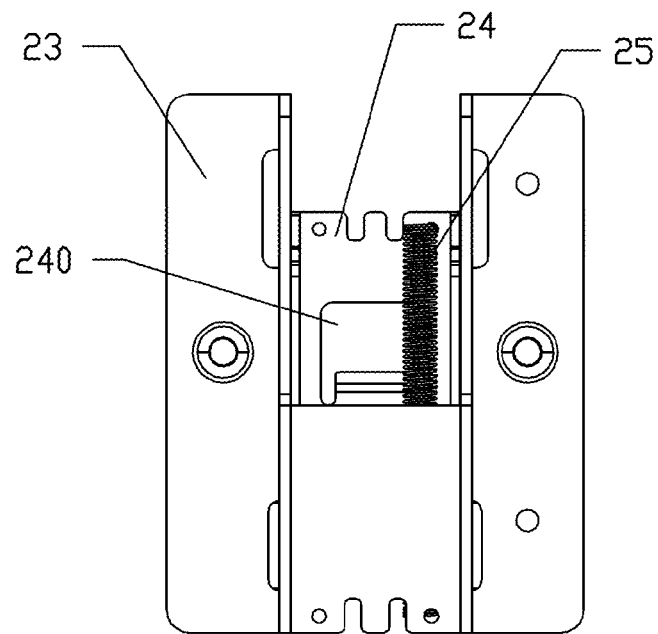
FIG. 8B is a front view of the conveying member of the conveying device in FIG. 8A.
Figure 9A:
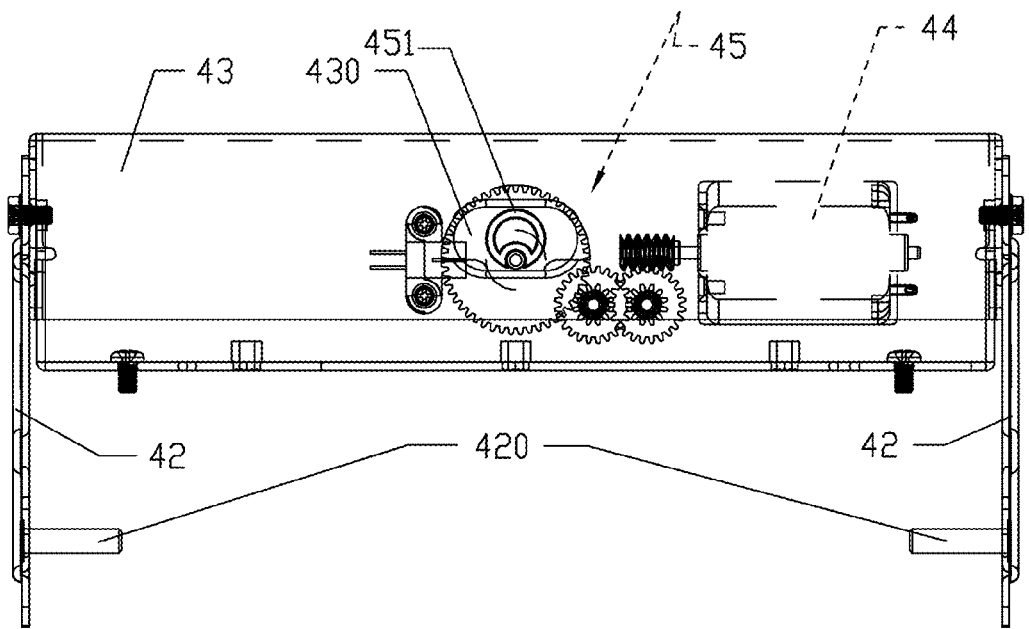
FIG. 9A to FIG. 9D are operational rear views of the of the disk conveying device.
Figure 9B:
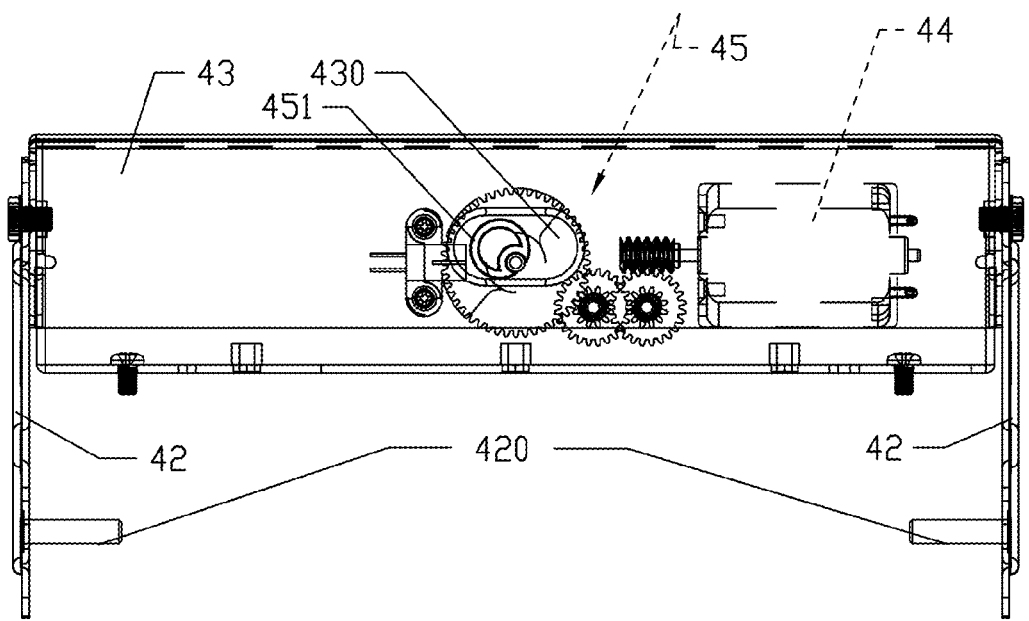
Figure 9C:
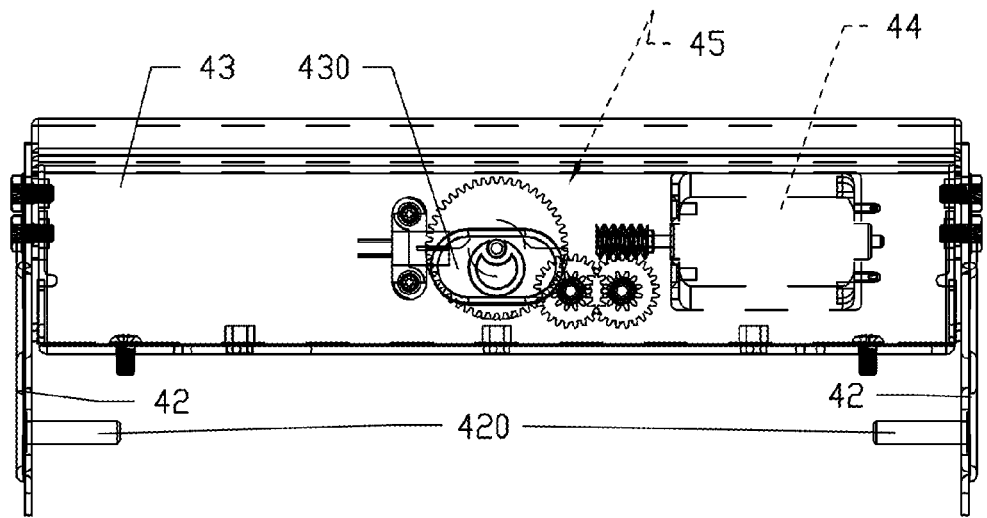
Figure 9D:
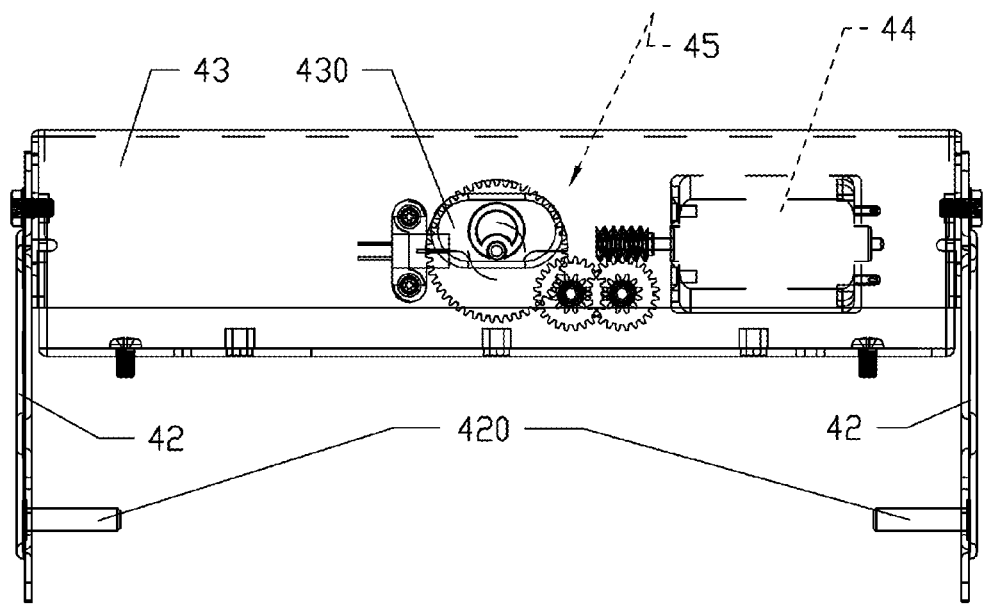
Figure 12A:
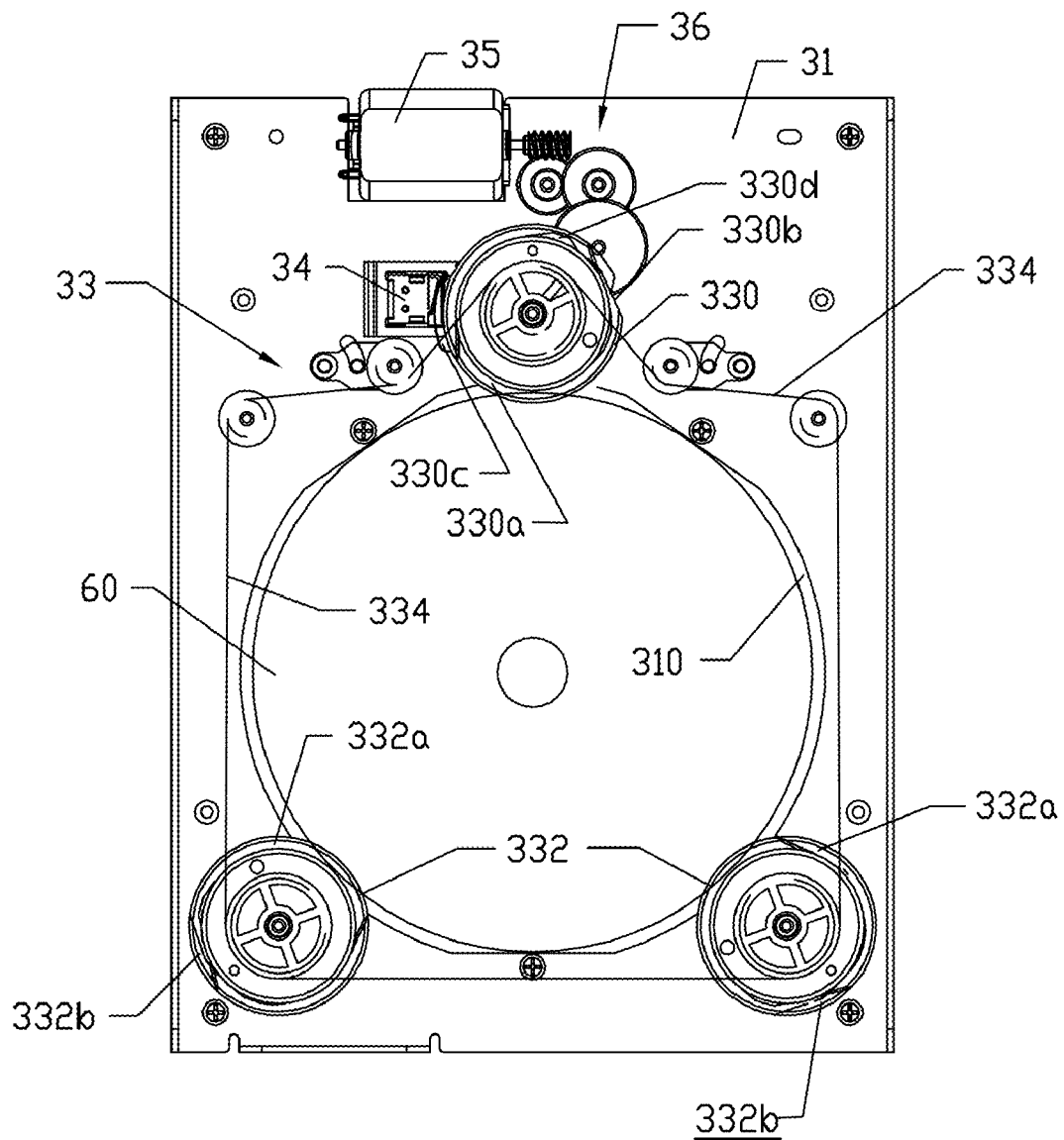
FIG. 12A and FIG. 12B are operational top views of the disk feeding device.

Refer to FIG. 6A, FIG. 6B and FIG. 12A. The disk feeding device 30 comprises a supporting plate 31, a supporting frame 32 and a disk feeding mechanism 33. The disk feeding device 30 has an opening 310 defined completely through the supporting plate 31 and the supporting frame 32. The opening 310 is aligned with the disk feeding hole 110 of the outer casing 11 and is larger than the compact disk 60 in size through which the compact disk 60 passes. The supporting frame 32 is mounted on the supporting plate 31 on which multiple disk posts 320 are mounted. The disk posts 320 holds the stack of compact disks 60 in position. The disk feeding mechanism 33 is mounted between the supporting plate 31 and the supporting frame 32 and suspends the stack of compact disks 60 over the opening 310.

Figure 12B:
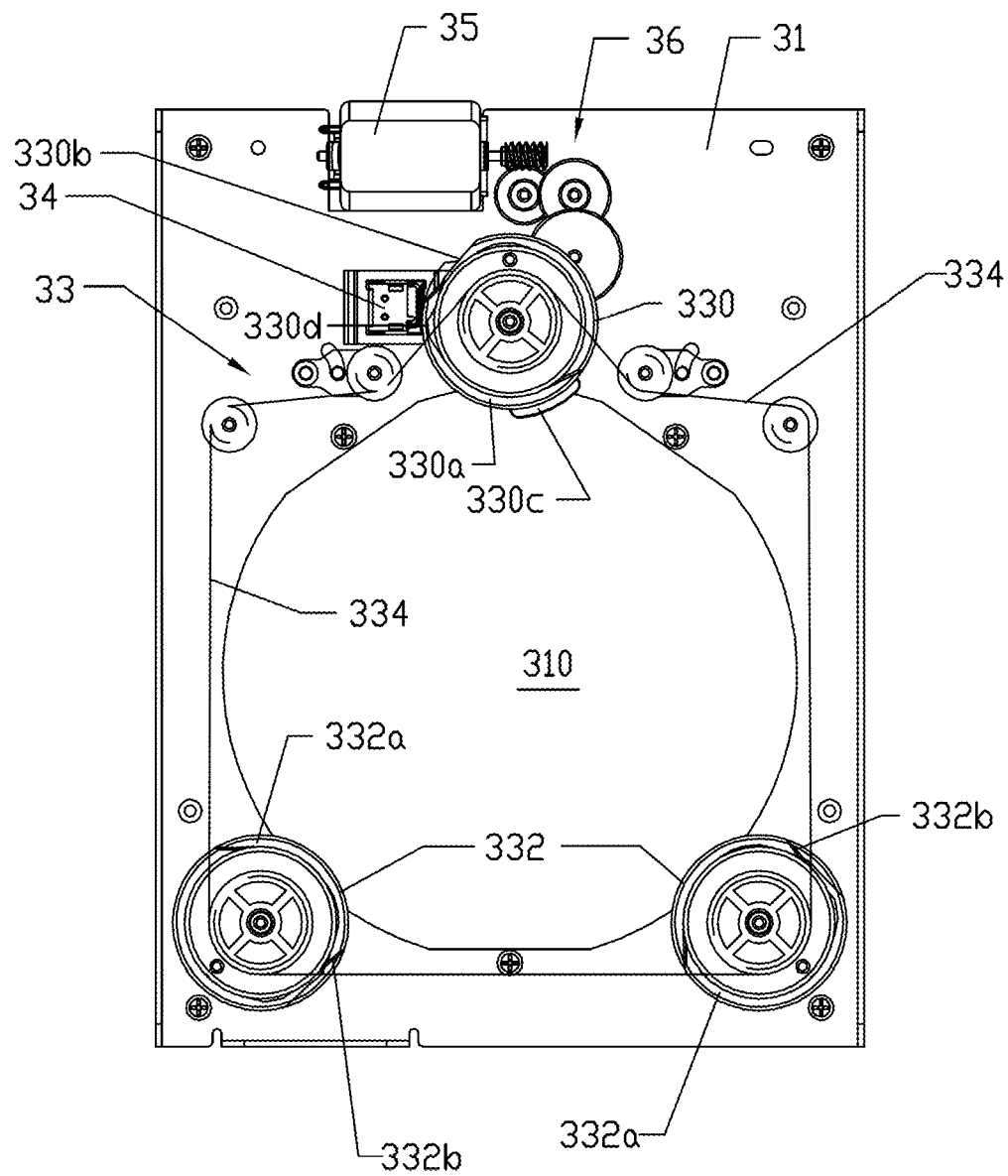

Further refer to FIG. 12B. The disk feeding mechanism 33 comprises multiple feeding wheels including a driving feeding wheel 330 and two driven feeding wheels 332, a power transmission member 334, a sensor 34, a power device 35 and a reducing device 36. The power device 35 may be a motor.

The reducing device 36 is coupled to the power device 35 and comprises multiple gears engaged one by another. The reducing device 36 reduces revolutions of the power device 35. The driving feeding wheel 330 engages the reducing device 36 and is rotated by the reducing device 36 when the power device 35 is turned on. The driving feeding wheel 330 rotates the driven feeding wheels 332 through the power transmission member 334. Thus, the feeding wheels rotate simultaneously through the power transmission member 334. The power transmission member 334 may be a transmission belt. The sensor 34 reacts to the revolutions of the driving feeding wheel 330.

Figure 13A:
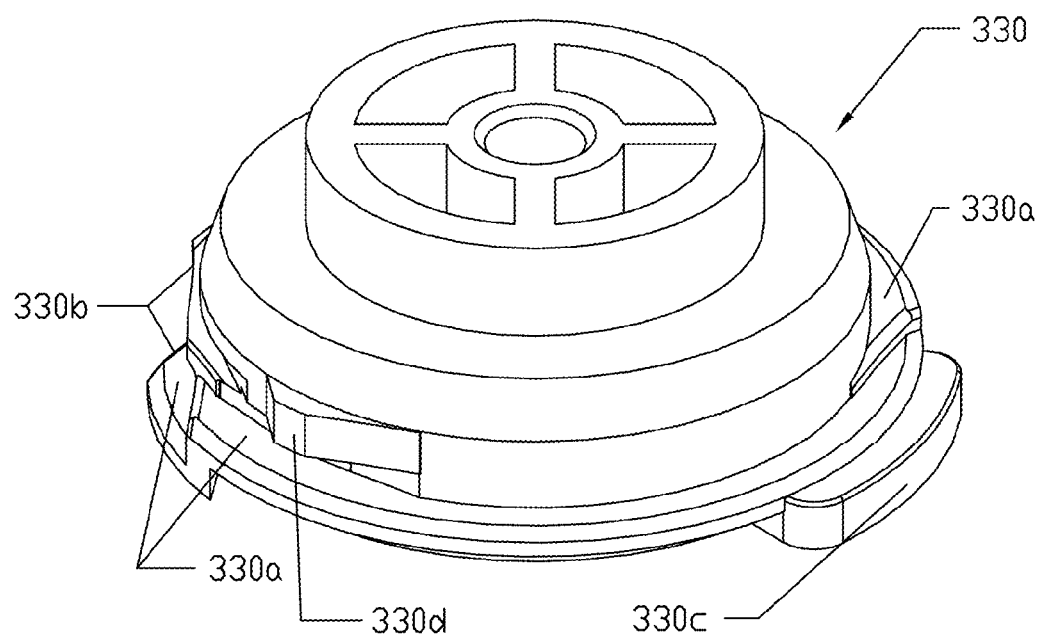
FIG. 13A and FIG. 13B are enlarged perspective views of a feeding wheel of the disk feeding device.
Figure 13B:
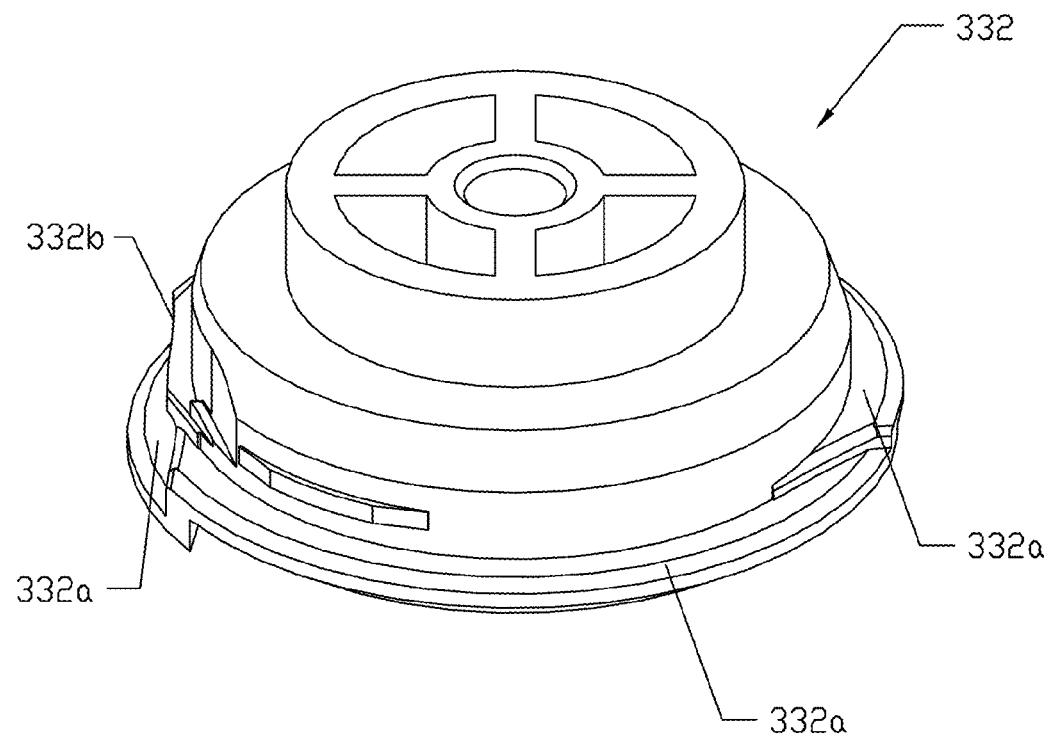

Refer to FIG. 13A and FIG. 13B. The driving feeding wheel 330 has multiple spiral flanges 330a, a cutting edge 330b, a sensing protrusion 330c and a pushing protrusion 330d. The cutting edge 330b is defined in the spiral flanges 330a. The sensing protrusion 330c is sensed by the sensor 34 so that the sensor 34 reacts to the driving feeding wheel 330. Likewise, the driven feeding wheel 332 has multiple spiral flanges 332a and a cutting edge 332b. The cutting edge 332b is defined in the spiral flanges 332a. Thus, the pushing protrusion 330d pushes a compact disk 60 (the bottom one of the stack compact disks held by the disk posts 320) towards the driven wheels 332 when the driving wheel 330 is rotated. The compact disk 60 is moved along the spiral flanges 330a, 332a as the feeding wheels 330,332 are rotated, is separated from the feeding wheels 330,332 through the cutting edges 330b, 330c and is eventually pulled onto the tray 51 by gravity.

The feeding operation of compact disk is stopped when the sensing protrusion 330c of the driving feeding wheel 330 is rotated to the sensor 34 and sensed by the sensor 34. At this moment, the feeding wheels 330, 332 are stopped. The rest of the stack of compact disks are held by the spiral flanges 330a, 332a over the disk feeding hole 110 of the outer casing 10. The disk feeding mechanism 33 feeds one single compact disk onto the tray 51 at a time.

Refer to FIG. 7A, FIG. 7B, FIG. 7C and FIG. 7D. The disk conveying device 40 further comprises a stationary support 41, two swinging arms 42, a connecting board 43, a driving unit 44 and a power transmission device 45. The stationary support 41 is mounted on the chassis body 20. The swinging arms 42 are pivotally mounted on the stationary support 41 and are connected by the connecting board 43. Each swinging arm 42 has an end extended toward the through hole 22 of the wing 21.

Further refer to FIG. 9A, FIG. 9B, FIG. 9C and FIG. 9D. The driving members 420, may be cylinders or bars, are respectively attached to the ends of the arms 42 and extended into the through holes 22 of the wings 21 and the recesses 240 of the conveying members 24. The connecting board 43 has an elongated hole 430. The driving unit 44 and the power transmission device 45 are mounted on the stationary support 41. The driving unit 44 may be a motor. The power transmission device 45 is coupled to the driving unit 44 to reduce the revolutions of the driving unit 44 and comprises multiple gears and an eccentric shaft 451. The eccentric shaft 451 is slidably mounted and held in the elongated hole 430 of the connecting board 43 and is rotated by the gears. Thus, when the driving unit 44 is turned on, the rotations of the eccentric shaft 451 cause the swinging arms 42 to swing upwardly and downwardly through the elongated hole 430 of the connecting board 43.

Figure 10A:
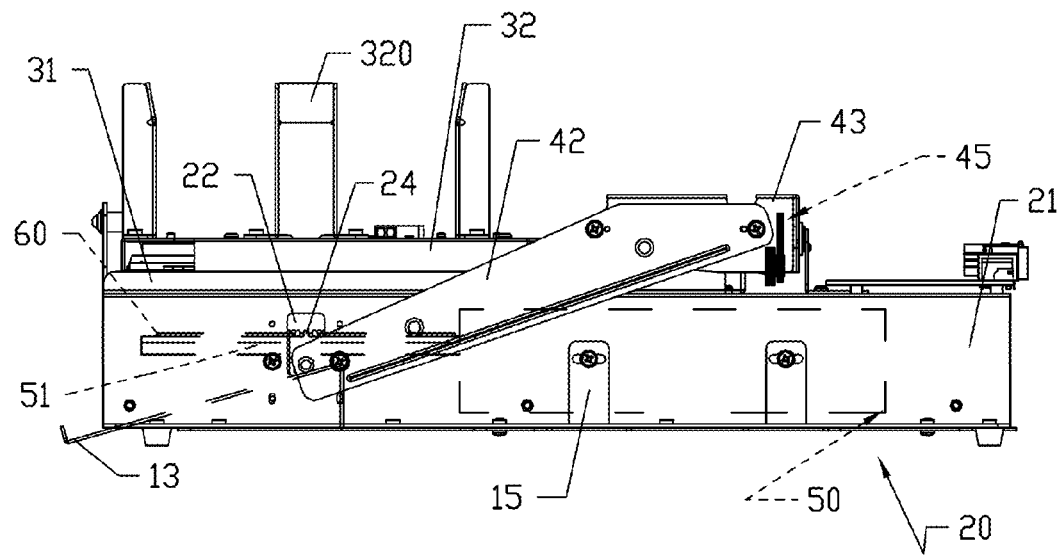
FIG. 10A to FIG. 10D are operational side views of the of the disk conveying device.
Figure 11A:
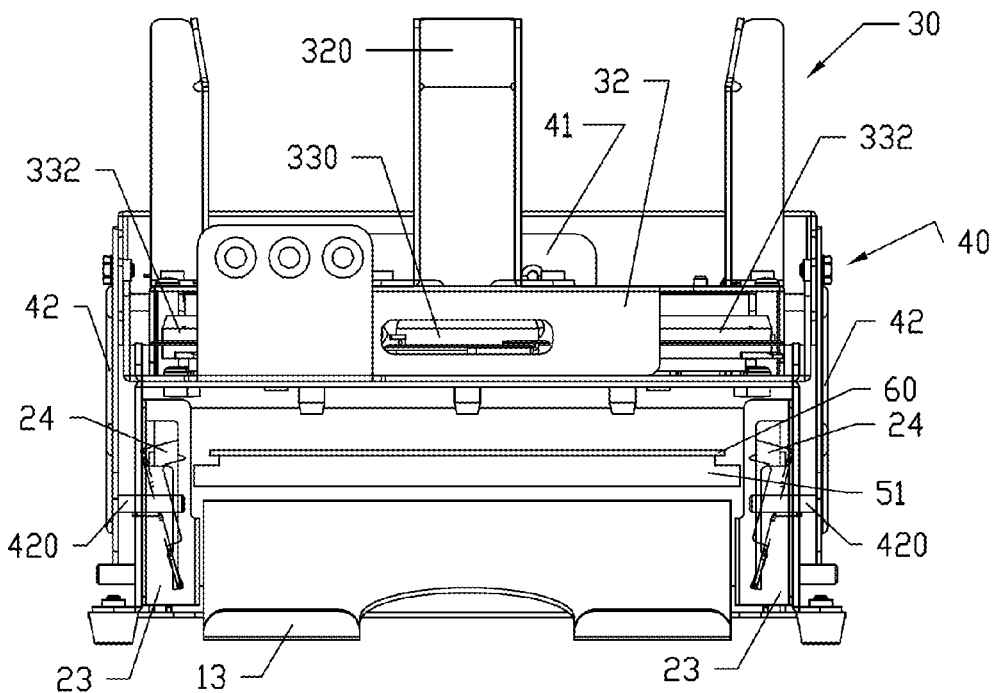
FIG. 11A to FIG. 11D are operational front views of the of the disk conveying device.

Refer to FIG. 10A and FIG. 11A. When the duplication operation is completed, the tray 51 with the recorded compact disk 60 is ejected to its ejected position.

Figure 10B:
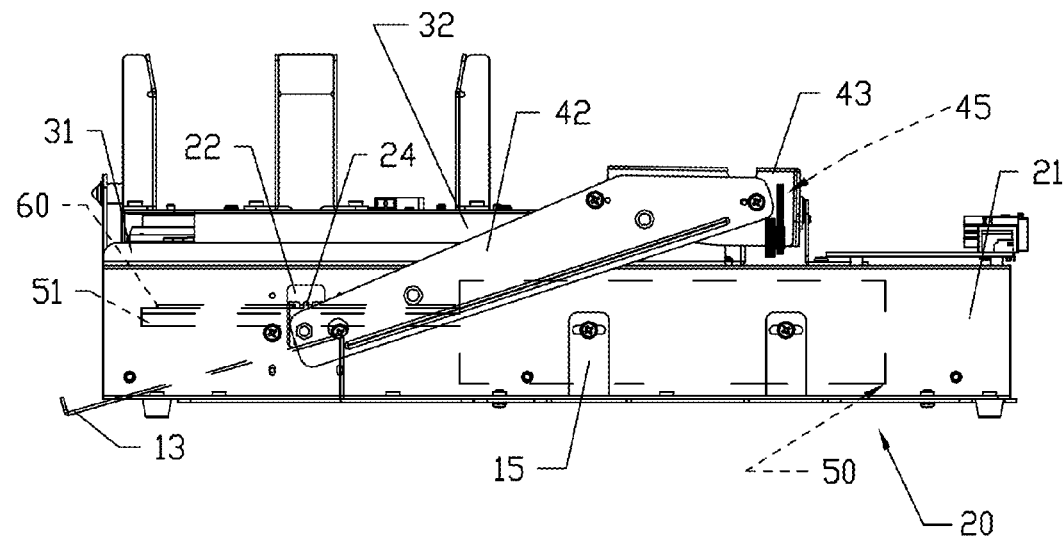
Figure 11B:
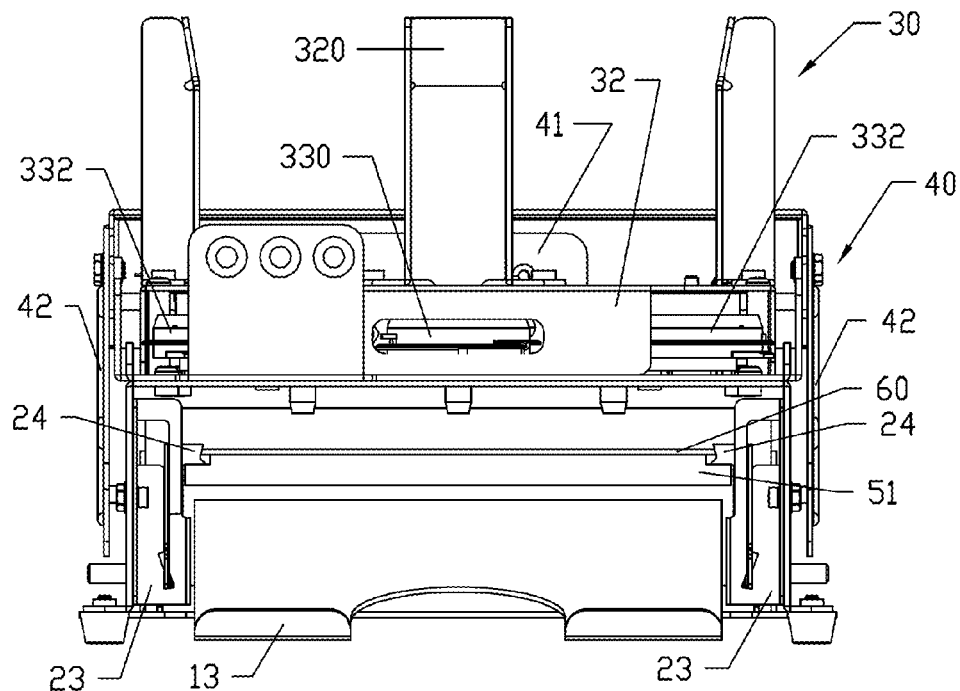

Refer to FIG. 10B and FIG. 11B. The swinging arms 42 are pivoted to move the driving members 420 upward, and the conveying members 24 grasp and hold the compact disk 60.

Figure 10C:
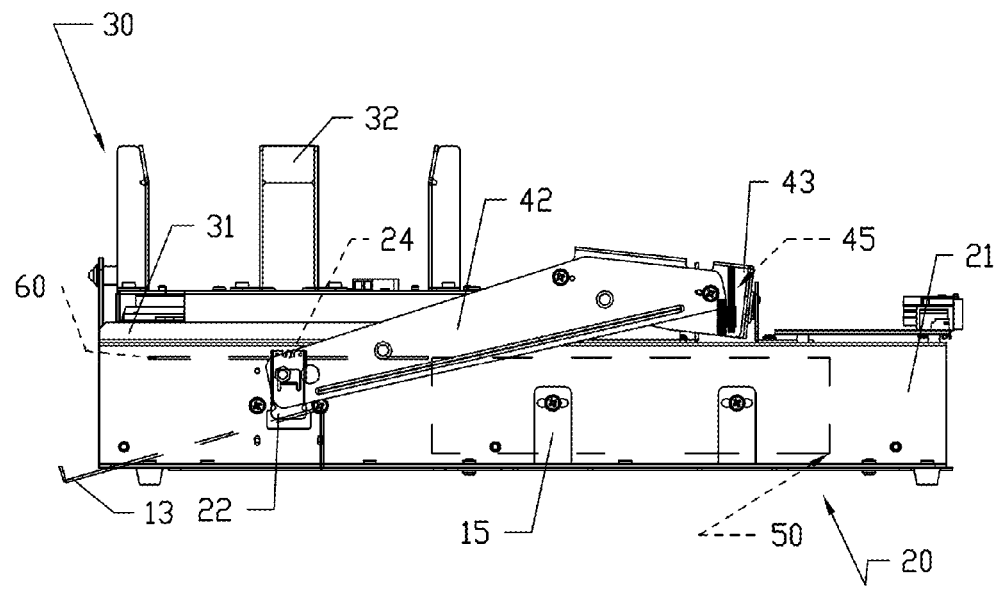
Figure 11C:
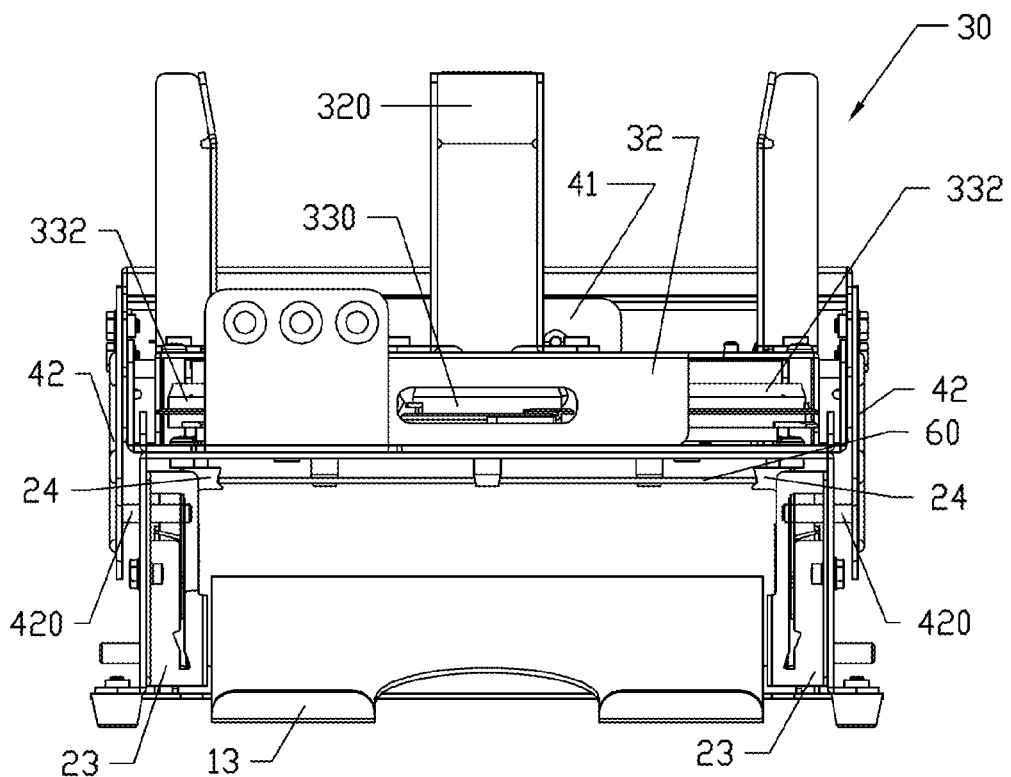

Refer to FIG. 10C and FIG. 11C. The driving members 420 are continuously moved upward, which respectively moves the conveying members 24 upwardly with the compact disk 60 along the tracks 23 to elevate and remove the compact disk 60 from the tray 51. Then, the tray 51 is retracted to its retracted position after the compact disk 60 has been removed.

Figure 10D:
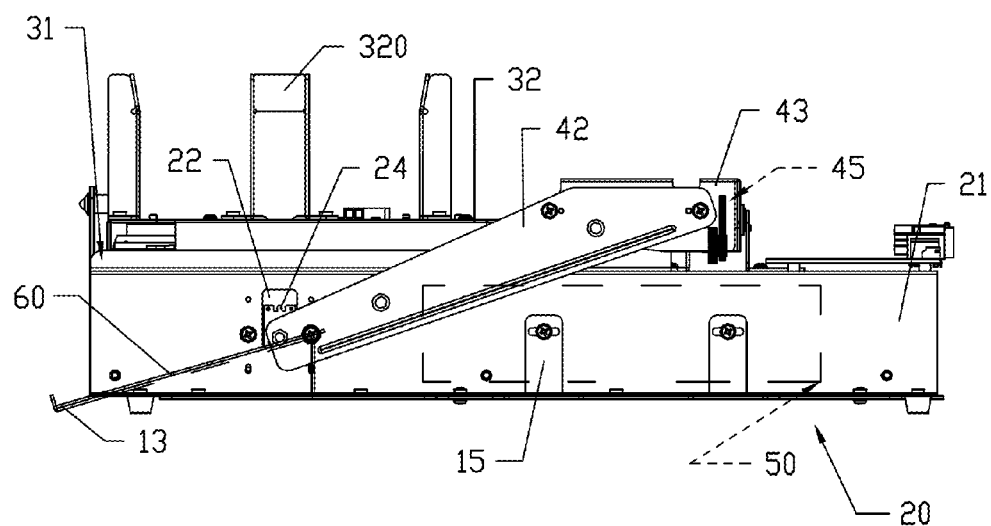
Figure 11D:
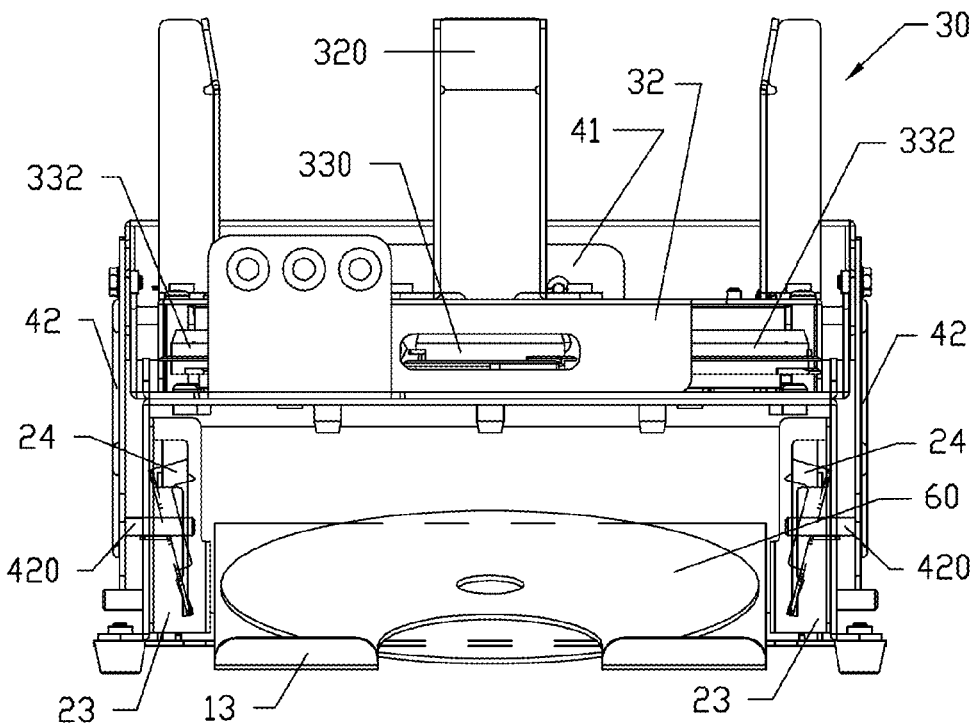

Refer to FIG. 10D and FIG. 11D. The swinging movements on the swinging arms 42 cause the driving members 420 to move downward so that the driving members 420 press on the bottom edges of the recesses 240 of the conveying members 24 until the conveying members 24 are inclined. The compact disk 60 falls on the disk holder 13. Thus, the conveying members 24 convey the compact disk 60 to the disk holder 13.

The main components and other components of the apparatus 1 are demountable from the chassis body 20. Those main components such as the housing 10, the disk holder 13 and the mounting plate 15. Consequently, assembling and maintaining the apparatus 1 is convenient, and manufacturing cost is low. Also, repairing the apparatus 1 is convenient.

Further, the apparatus 1 does not need a large space to transport the compact disks including unrecorded disks and recorded disks. Therefore, the apparatus 1 is convenient to use.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An automatic disk reproducing method comprising
   holding a stack of compact disks in position and using gravity to pull the compact disk at the bottom of the stack of compact disks once by a disk feeding device;
   receiving the fallen compact disk on a tray of a duplicating device to duplicate where the tray is at an ejected position;
   retracting the tray to a retracted position;
   recording the compact disk on the tray;
   ejecting the tray with the recorded compact disk to the ejected position;
   elevating the recorded compact disk from the tray by a disk conveying device;
   retracting the tray to the retracted position; and
   conveying the recorded compact disk to a disk holder by the disk conveying device.

2. The method as claimed in claim 1, wherein the disk feeding device comprises a disk feeding mechanism, and the disk feeding mechanism comprises
   multiple feeding wheels, each feeding wheel having multiple spiral flanges and a cutting edge defined in the spiral flanges;
   a power transmission member;
   a power device; and
   a reducing device coupled to the power device;
   wherein the feeding wheels engage the reducing device, are rotated by the reducing device through the power transmission member as the power device is turned on.

3. The method as claimed in claim 1, wherein the disk conveying device comprises two conveying members and two swinging arms connected respectively to the conveying members to elevate the recorded compact disk from the tray.

4. The method as claimed in claim 1, wherein the duplicating device is a compact disk burner.

* * * * *